United States Patent
Tanabe

(10) Patent No.: US 8,731,613 B2
(45) Date of Patent: May 20, 2014

(54) MOBILE PHONE, IMAGING SYSTEM EMPLOYING MOBILE PHONE AND IMAGING METHOD EMPLOYING MOBILE PHONE

(75) Inventor: Hideki Tanabe, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 60 days.

(21) Appl. No.: 12/849,397

(22) Filed: Aug. 3, 2010

(65) Prior Publication Data

US 2011/0105180 A1 May 5, 2011

(30) Foreign Application Priority Data

Aug. 3, 2009 (JP) ................................. 2009-180551

(51) Int. Cl.
*H04M 1/00* (2006.01)

(52) U.S. Cl.
USPC .................. 455/556.1; 455/550.1; 455/556.2; 455/557; 348/207.99; 348/207.1; 348/207.11; 348/207.2

(58) Field of Classification Search
USPC ...................................................... 455/556.1
See application file for complete search history.

(56) References Cited

U.S. PATENT DOCUMENTS

| | | | |
|---|---|---|---|
| 6,424,648 B1 * | 7/2002 | Ng et al. ........................ | 370/352 |
| 7,671,886 B2 * | 3/2010 | Sawada ...................... | 348/14.01 |
| 7,957,766 B2 * | 6/2011 | Gong et al. ................ | 455/556.1 |
| 2004/0032503 A1 * | 2/2004 | Monden et al. .......... | 348/207.99 |
| 2005/0192050 A1 * | 9/2005 | Son et al. ................... | 455/556.1 |
| 2007/0238484 A1 * | 10/2007 | Liu ............................... | 455/557 |
| 2007/0254640 A1 | 11/2007 | Bliss | |
| 2010/0062802 A1 * | 3/2010 | Amram ...................... | 455/556.1 |

FOREIGN PATENT DOCUMENTS

| | | |
|---|---|---|
| JP | 2003-219043 A | 7/2003 |
| JP | 2005-12579 A | 1/2005 |
| JP | 2005-101867 A | 4/2005 |
| JP | 2005-323254 A | 11/2005 |
| JP | 2007-195200 A | 8/2007 |

OTHER PUBLICATIONS

Extended European Search Report Dated Sep. 20, 2013 (seven (7) pages).

* cited by examiner

*Primary Examiner* — Liton Miah
(74) *Attorney, Agent, or Firm* — Crowell & Moring LLP

(57) ABSTRACT

This mobile phone includes a control portion controlling an imaging portion to execute an imaging operation when detecting that a communication state established by taking a telephone call has been disconnected after a ringtone in taking the telephone call is repeated the first number of times in a case where a first communication portion capable of telephone communication takes the telephone call from an operating-side mobile phone.

20 Claims, 6 Drawing Sheets

MOBILE PHONE, IMAGING SYSTEM EMPLOYING MOBILE PHONE AND IMAGING METHOD EMPLOYING MOBILE PHONE

BACKGROUND OF THE INVENTION

1. Field of the Invention

The present invention relates to a mobile phone, an imaging system employing the same and an imaging method employing the same, and more particularly, it relates to a mobile phone including an imaging portion (camera function), an imaging system employing the same and an imaging method employing the same.

2. Description of the Background Art

A mobile phone including an imaging portion (camera function), an imaging system employing the same and an imaging method employing the same is known in general, as disclosed in each of Japanese Patent Laying-Open Nos. 2005-101867, 2005-323254 and 2003-219043, for example.

The aforementioned Japanese Patent Laying-Open No. 2005-101867 discloses a mobile phone, having a camera function (imaging portion) executing an imaging operation in response to an incoming signal from another mobile phone having a previously registered telephone number. This mobile phone is formed to perform the imaging operation with a camera when receiving the incoming signal from another mobile phone having the previously registered telephone number. The mobile phone disclosed in the aforementioned Japanese Patent Laying-Open No. 2005-101867 has a self-timer. The mobile phone disclosed in the aforementioned Japanese Patent Laying-Open No. 2005-101867 is formed to be capable of starting the self-timer when receiving the incoming signal from another mobile phone having the previously registered telephone number and performing the imaging operation with a camera after a time of the self-timer elapses, in a case where the self-timer has been previously set.

The aforementioned Japanese Patent Laying-Open No. 2005-323254 discloses a camera (imaging portion) mobile phone capable of executing an imaging operation in response to an incoming signal from a remote mobile phone. The camera mobile phone according to the aforementioned Japanese Patent Laying-Open No. 2005-323254 is formed to establish a telephone call state by receiving a transmission signal from the remote mobile phone and to thereafter perform the imaging operation on the basis of a prescribed operation from the remote mobile phone, such as input of a password or setting of a timer.

The aforementioned Japanese Patent Laying-Open No. 2003-219043 discloses a folding camera (imaging portion) mobile phone capable of executing an imaging operation on the basis of an operation from a remote operating terminal. The folding camera mobile phone according to the aforementioned Japanese Patent Laying-Open No. 2003-219043 is formed to receive a control command such as an instruction for executing the imaging operation from the remote operating terminal by communicating with a common carrier server or the like and to perform the imaging operation in response to the received control command.

However, the mobile phone disclosed in the aforementioned Japanese Patent Laying-Open No. 2005-101867 may easily or hardly take a telephone call depending on a radio wave condition or the like in receiving a signal, in a case of performing the imaging operation of a camera when the signal is received. In this case, the imaging operation with a camera is not necessarily performed at the same time of transmitting a signal from the mobile phone (caller) having the previously registered telephone number, and timing of the imaging operation is disadvantageously not constant.

In the camera mobile phone disclosed in the aforementioned Japanese Patent Laying-Open No. 2005-323254, the telephone call state must be established by receiving a transmission signal from the remote mobile phone and the prescribed operation from the remote mobile phone, such as input of a password or setting of a timer, must be thereafter performed in order for the camera mobile phone to perform the imaging operation, and hence a user must perform complicated operations.

The folding camera mobile phone disclosed in the aforementioned Japanese Patent Laying-Open No. 2003-219043 must receive the control command such as the instruction for executing the imaging operation from the remote operating terminal by communicating with the common carrier server or the like to perform the imaging operation. Thus, a user must perform corresponding operations to transmit the control command such as the instruction for executing the imaging operation to the folding camera mobile phone in order for the folding camera mobile phone to perform the imaging operation, and hence the user must perform complicated operations.

SUMMARY OF THE INVENTION

The present invention has been proposed in order to solve the aforementioned problems, and an object of the present invention is to provide a mobile phone capable of equalizing timing of an imaging operation of a camera while simplifying user's operations, an imaging system employing the same and an imaging method employing the same.

In order to attain the aforementioned object, a mobile phone according to a first aspect of the present invention comprises a first communication portion capable of telephone communication, an imaging portion, and a control portion controlling the imaging portion to execute an imaging operation when detecting that a communication state established by making a telephone call or taking a telephone call has been disconnected by a user after a ring-back tone in making the telephone call or a ringtone in taking the telephone call is repeated the first number of times in a case where the first communication portion makes the telephone call to an operating-side mobile phone or the first communication portion takes the telephone call from the operating-side mobile phone.

In the mobile phone according to the first aspect of the present invention, as hereinabove described, the control portion controlling the imaging portion to execute an imaging operation when detecting that the communication state established by making the telephone call or taking the telephone call has been disconnected by the user after the ring-back tone in making the telephone call or the ringtone in taking the telephone call is repeated the first number of times in a case where the first communication portion makes the telephone call to the operating-side mobile phone or the first communication portion takes the telephone call from the operating-side mobile phone is provided so that the control portion controls the imaging portion to execute an imaging operation in a state where a communication state after the first communication portion once makes or takes the telephone call is established, and hence the mobile phone can equalize timing of an imaging operation of a camera unlike a mobile phone performing an imaging operation of a camera when taking or making a telephone call. Further, the control portion controlling the imaging portion to execute an imaging operation when detecting that the communication state established by making the telephone call or taking the telephone call has been disconnected by the user after the ring-back tone in making the telephone call or the ringtone in taking the telephone call is repeated the first number of times is provided so that the imaging portion can execute an imaging operation without an operation for establishing a telephone state with the other side and an operation for performing an imaging operation as well as a complicated operation for transmitting control commands. Thus, the number of operations that the user performs can be reduced. Consequently, timing of an imaging operation of a camera can be equalized while simplifying user's operations.

In the aforementioned mobile phone according to the first aspect, the control portion is preferably formed to control the imaging portion to execute an imaging operation when detecting that the telephone call made by the first communication portion or the telephone call taken by the first communication portion has been disconnected by a user during a period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times. According to this structure, the imaging portion is allowed to execute an imaging operation only during the period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times, and hence an imaging operation of a camera can be performed at a prescribed timing during the period.

The aforementioned mobile phone according to the first aspect preferably further comprises a second communication portion formed to be capable of communicating with the operating-side mobile phone by a method other than telephone communication and capable of acquiring identification information of the operating-side mobile phone, wherein the control portion is formed to control the imaging portion to execute an imaging operation when detecting that a communication state established by making a telephone call to and taking a telephone call from the operating-side mobile phone corresponding to identification information previously acquired by the second communication portion has been disconnected by a user. According to this structure, the imaging portion does not execute an imaging operation when taking a telephone call from a mobile phone not corresponding to the identification information previously acquired by the second communication portion, and hence an imaging operation of a camera due to an unexpected telephone call can be inhibited.

In this case, the identification information of the operating-side mobile phone preferably includes at least either a telephone number or a mail address of the operating-side mobile phone. According to this structure, the operating-side mobile phone can be identified using a telephone number and a mail address that a mobile phone substantially reliably has, and hence no special function of identifying the operating-side mobile phone may be provided. Thus, many types of mobile phones can be employed as the operating-side mobile phone.

The aforementioned mobile phone according to the first aspect is preferably formed to be capable of being switched to a remote imaging mode allowing the imaging portion to execute an imaging operation by remote operation from the operating-side mobile phone, wherein the control portion is formed to control the imaging portion to execute an imaging operation when detecting that the communication state established by making the telephone call or taking the telephone call has been disconnected by a user after the ring-back tone in making the telephone call or the ringtone in taking the telephone call is repeated the first number of times in the remote imaging mode. According to this structure, the imaging portion is allowed to execute an imaging operation in the remote imaging mode, and hence an imaging operation is not performed even if it is detected that the communication state established by making the telephone call or taking the telephone call has been disconnected by the user after the ring-back tone in making the telephone call or the ringtone in taking the telephone call is repeated the first number of times in another mode other than the remote imaging mode. Thus, an imaging operation of a camera can be prevented when the user would not like to perform the imaging operation of a camera.

The aforementioned mobile phone having the remote imaging mode preferably further comprises a second communication portion formed to be capable of communicating with the operating-side mobile phone by a method other than telephone communication, wherein the control portion is formed to control the second communication portion to acquire identification information of the operating-side mobile phone on the basis of switch to the remote imaging mode. According to this structure, the identification information of the operating-side mobile phone can be easily acquired when the mobile phone is switched to the remote imaging mode.

In this case, a user can select or input the identification information of the operating-side mobile phone when the control portion cannot acquire the identification information of the operating-side mobile phone through the second communication portion, and the control portion is formed to be capable of acquiring the identification information of the operating-side mobile phone on the basis of selection or input of the identification information by the user. According to this structure, the user inputs or selects the identification information of the operating-side mobile phone incapable of communicating with the second communication portion by operating a mobile phone performing an imaging operation also when the user would like to perform an imaging operation of a camera using the operating-side mobile phone incapable of communicating with the second communication portion, whereby the user can perform the imaging operation of a camera using the operating-side mobile phone incapable of communicating with the second communication portion.

In the aforementioned mobile phone according to the first aspect, the control portion is preferably formed to control the imaging portion to execute an imaging operation when a communication state established by taking a telephone call has been disconnected by a user after a ringtone in taking the telephone call is repeated the first number of times in a case where the first communication portion takes the telephone call. According to this structure, timing of an imaging operation of a camera can be equalized while simplifying user's operations in a case where the telephone call is disconnected after the first communication portion of the imaging-side mobile phone takes the telephone call thereby establishing the communication state.

The aforementioned mobile phone comprising the control portion controlling the imaging portion to execute an imaging portion when the taken telephone call has been disconnected is preferably formed to be capable of being switched to a remote imaging mode allowing the imaging portion to execute an imaging operation by remote operation from the operating-side mobile phone and preferably further comprises a second communication portion formed to be capable of communicating with the operating-side mobile phone by a method other than telephone communication and capable of acquiring identification information of the operating-side mobile phone, wherein the control portion is formed to refuse to take a telephone call from an operating-side mobile phone having identification information different from previously acquired identification information of the operating-side mobile phone when identification information of the operating-side mobile phone making the telephone call is different from the previously acquired identification information in the remote imaging mode. According to this structure, an imaging operation of a camera based on the telephone call from the mobile phone having identification information different from the previously acquired identification information can be prevented in the remote imaging mode.

The aforementioned mobile phone comprising the control portion controlling the imaging portion to execute an imaging portion when the taken telephone call has been disconnected preferably has an answering machine mode for recording a telephone call after taking the telephone call or a telephone transfer mode, wherein the control portion is formed to cancel the answering machine mode or the telephone transfer mode when acquiring identification information of the operating-side mobile phone. According to this structure, a received telephone call can be inhibited from being connected due to the answering machine mode or the telephone transfer mode when receiving the telephone call to perform an imaging operation in the present invention, and hence an imaging operation of a camera can be inhibited from being incapable of being performed due to connection of the received telephone call.

An imaging system employing mobile phones according to a second aspect of the present invention comprises an operating-side mobile phone capable of telephone communication, and an imaging-side mobile phone including a first communication portion capable of telephone communication, an imaging portion and a control portion controlling the imaging portion to execute an imaging operation when detecting that a communication state established by making a telephone call or taking a telephone call has been disconnected by a user after a ring-back tone in making the telephone call or a ringtone in taking the telephone call is repeated the first number of times in a case where the first communication portion makes the telephone call to the operating-side mobile phone or the communication portion takes the telephone call from the operating-side mobile phone.

In the imaging system employing mobile phones according to the second aspect of the present invention, as hereinabove described, the control portion controlling the imaging portion to execute an imaging operation when detecting that the communication state established by making the telephone call or taking the telephone call has been disconnected by the user after the ring-back tone in making the telephone call or the ringtone in taking the telephone call is repeated the first number of times in a case where the first communication portion makes the telephone call to the operating-side mobile phone or the first communication portion takes the telephone call from the operating-side mobile phone is provided so that the control portion controls the imaging portion to execute an imaging operation in a state where a communication state after the first communication portion once makes or takes the telephone call is established, and hence the imaging-side mobile phone can equalize timing of an imaging operation of a camera unlike a mobile phone performing an imaging operation of a camera when taking or making a telephone call. Further, the control portion controlling the imaging portion to execute an imaging operation when detecting that the communication state established by making the telephone call or taking the telephone call has been disconnected by the user after the ring-back tone in making the telephone call or the ringtone in taking the telephone call is repeated the first number of times is provided so that the imaging portion can execute an imaging operation without an operation for establishing a telephone state with the other side and an operation for performing an imaging operation as well as a complicated operation for transmitting control commands. Thus, the number of operations that the user performs can be reduced. Consequently, timing of an imaging operation of a camera can be equalized while simplifying user's operations.

In the aforementioned imaging system employing mobile phones according to the second aspect, the control portion of the imaging-side mobile phone is preferably formed to control the imaging portion of the imaging-side mobile phone to execute an imaging operation when detecting that the telephone call made by the first communication portion or the telephone call taken by the first communication portion has been disconnected by a user during a period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times. According to this structure, the imaging portion is allowed to execute an imaging operation only during the period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times, and hence an imaging operation of a camera can be performed at a prescribed timing during the period.

In the aforementioned imaging system employing mobile phones according to the second aspect, the imaging-side mobile phone preferably further includes a second communication portion formed to be capable of communicating with the operating-side mobile phone by a method other than telephone communication and capable of acquiring identification information of the operating-side mobile phone, and the control portion of the imaging-side mobile phone is preferably formed to control the imaging portion of the imaging-side mobile phone to execute an imaging operation when detecting that a communication state established by making a telephone call to and taking a telephone call from the operating-side mobile phone corresponding to identification information previously acquired by the second communication portion has been disconnected by a user. According to this structure, the imaging portion does not execute an imaging operation when taking a telephone call from a mobile phone not corresponding to the identification information previously acquired by the second communication portion, and hence an imaging operation of a camera due to an unexpected telephone call can be inhibited.

In the aforementioned imaging system employing mobile phones according to the second aspect, the imaging-side mobile phone is preferably formed to be capable of being switched to a remote imaging mode allowing the imaging portion of the imaging-side mobile phone to execute an imaging operation by remote operation from the operating-side mobile phone, and the control portion of the imaging-side mobile phone is preferably formed to control the imaging portion of the imaging-side mobile phone to execute an imaging operation when detecting that the communication state established by making the telephone call or taking the telephone call has been disconnected by a user after the ring-back tone in making the telephone call or the ringtone in taking the telephone call is repeated the first number of times in the remote imaging mode. According to this structure, the imaging portion is allowed to execute an imaging operation in the remote imaging mode, and hence an imaging operation is not performed even if it is detected that the communication state established by making the telephone call or taking the telephone call has been disconnected by the user after the ring-back tone in making the telephone call or the ringtone in taking the telephone call is repeated the first number of times in another mode other than the remote imaging mode. Thus, an imaging operation of a camera can be prevented when the user would not like to perform the imaging operation of a camera.

In the aforementioned imaging system employing mobile phones according to the second aspect, the control portion of the imaging-side mobile phone is preferably formed to control the imaging portion of the imaging-side mobile phone to execute an imaging operation when a communication state established by taking a telephone call has been disconnected by a user after a ringtone in taking the telephone call is repeated the first number of times in a case where the first communication portion takes the telephone call. According to this structure, timing of an imaging operation of a camera can be equalized while simplifying user's operations in a case where the telephone call is disconnected after the first communication portion of the imaging-side mobile phone takes the telephone call thereby establishing the communication state.

In this case, the imaging-side mobile phone is preferably formed to be capable of being switched to a remote imaging mode allowing the imaging portion to execute an imaging operation by remote operation from the operating-side mobile phone, the imaging-side mobile phone preferably further includes a second communication portion formed to be capable of communicating with the operating-side mobile phone by a method other than telephone communication and capable of acquiring identification information of the operating-side mobile phone, and the control portion of the imaging-side mobile phone is preferably formed to refuse to take a telephone call from an operating-side mobile phone having identification information different from previously acquired identification information of the operating-side mobile phone when identification information of the operating-side mobile phone making the telephone call is different from the previously acquired identification information in the remote imaging mode. According to this structure, an imaging operation of a camera based on the telephone call from the mobile phone having identification information different from the previously acquired identification information can be prevented in the remote imaging mode.

An imaging method employing mobile phones according to a third aspect of the present invention comprises steps of making a telephone call from an imaging-side mobile phone to an operating-side mobile phone or making a telephone call from the operating-side mobile phone to the imaging-side mobile phone on the basis of an operation of a user and making an imaging portion of the imaging-side mobile phone execute an imaging operation when detecting that the telephone call made by the imaging-side mobile phone or the telephone call taken by the imaging-side mobile phone has been disconnected by a user after a ring-back tone in making the telephone call or a ringtone in taking the telephone call is repeated the first number of times.

As hereinabove described, the imaging method employing mobile phones according to the third aspect of the present invention comprises the step of making the imaging portion execute an imaging operation when detecting that the telephone call made by the imaging-side mobile phone or the telephone call taken by the imaging-side mobile phone has been disconnected by the user after the ring-back tone in making the telephone call or the ringtone in taking the telephone call is repeated the first number of times, whereby the imaging portion is controlled to execute an imaging operation in a state where a communication state after once making or taking the telephone call is established, and hence the imaging-side mobile phone can equalize timing of an imaging operation of a camera unlike a mobile phone performing an imaging operation of a camera when taking or making a telephone call. Further, the imaging method employing mobile phones according to the third aspect of the present invention comprises the step of making the imaging portion execute an imaging operation when detecting that the communication state established by the telephone call made by the imaging-side mobile phone or the telephone call taken by the imaging-side mobile phone has been disconnected by the user, whereby the imaging portion can execute an imaging operation without an operation for establishing a telephone state with the other side and an operation for performing an imaging operation as well as a complicated operation for transmitting control commands. Thus, the number of operations that the user performs can be reduced. Consequently, timing of an imaging operation of a camera can be equalized while simplifying user's operations.

In the aforementioned imaging method employing mobile phones according to the third aspect, the step of making the imaging portion of the imaging-side mobile phone execute an imaging operation preferably includes a step of making the imaging portion of the imaging-side mobile phone execute an imaging operation when detecting that the telephone call made by the imaging-side mobile phone or the telephone call taken by the imaging-side mobile phone has been disconnected by a user during a period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times. According to this structure, the imaging portion is allowed to execute an imaging operation only during the period after the ring-back tone in making the telephone call or the ringtone in taking the telephone call is repeated the first number of times and before the ring-back tone in making the telephone call or the ringtone in taking the telephone call is repeated the second number of times, which is the number of times subsequent to the first number of times, and hence an imaging operation of a camera can be performed at a prescribed timing during the period.

The aforementioned imaging method employing mobile phones according to the third aspect preferably further comprises a step of previously acquiring identification information of the operating-side mobile phone by communicating with the operating-side mobile phone by a method other than telephone communication through a second communication portion of the imaging-side mobile phone in advance of the step of making the imaging portion of the imaging-side mobile phone execute an imaging operation, wherein the step of making the imaging portion of the imaging-side mobile phone execute an imaging operation includes a step of making the imaging portion of the imaging-side mobile phone execute an imaging operation when detecting that a communication state established by making the telephone call to or taking the telephone call from the operating-side mobile phone corresponding to identification information previously acquired by the second communication portion has been disconnected by a user. According to this structure, the imaging portion of the imaging-side mobile phone does not execute an imaging operation when taking a telephone call from a mobile phone not corresponding to the identification information previously acquired by the second communication portion, and hence an imaging operation of a camera due to an unexpected telephone call can be inhibited.

The aforementioned imaging method employing mobile phones according to the third aspect preferably further comprises a step of switching the imaging-side mobile phone to a remote imaging mode allowing the imaging portion to execute an imaging operation by remote operation from the operating-side mobile phone in advance of the step of making the imaging portion of the imaging-side mobile phone execute an imaging operation, wherein the step of making the imaging portion of the imaging-side mobile phone execute an imaging operation includes a step of making the imaging portion of the imaging-side mobile phone execute an imaging operation when detecting that a communication state established by making the telephone call or taking the telephone call has been disconnected by a user after the ring-back tone in making the telephone call or the ringtone in taking the telephone call is repeated the first number of times in the remote imaging mode. According to this structure, the imaging portion is allowed to execute an imaging operation in the remote imaging mode, and hence an imaging operation is not performed even if it is detected that the communication state established by making the telephone call or taking the telephone call has been disconnected by the user after the ring-back tone in making the telephone call or the ringtone in taking the telephone call is repeated the first number of times in another mode other than the remote imaging mode. Thus, an imaging operation of a camera can be prevented when the user would not like to perform the imaging operation of a camera.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

First, the structure of an imaging system constituted by a camera-side mobile phone 100 and an operating-side mobile phone 200 according to a first embodiment of the present invention is described with reference to FIGS. 1 to 4. The camera-side mobile phone 100 is examples of the "imaging-side mobile phone" and the "mobile phone" in the present invention.

Figure 1:
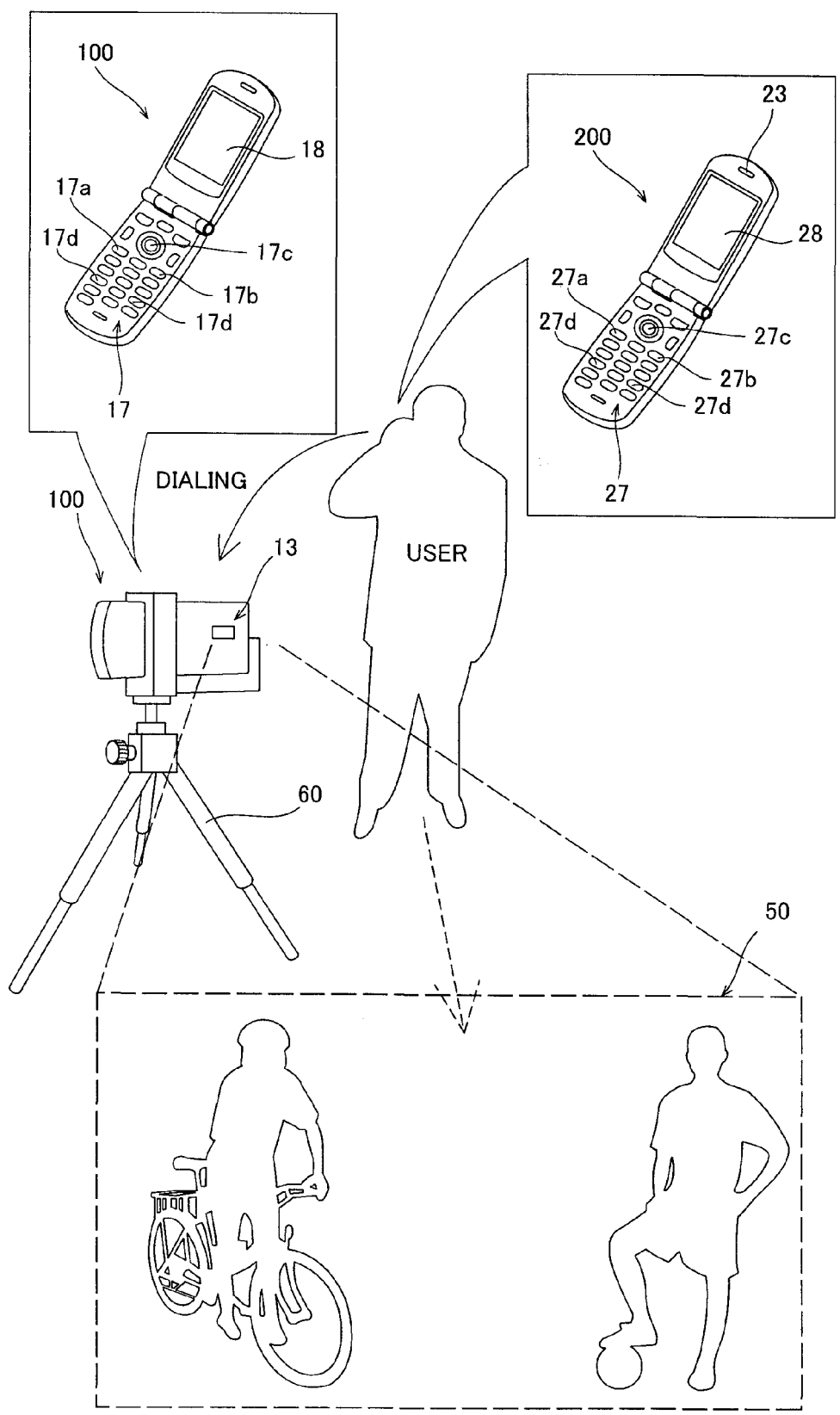
FIG. 1 illustrates a preparatory stage of remote imaging employing an imaging system employing mobile phones according to a first embodiment of the present invention.
Figure 2:
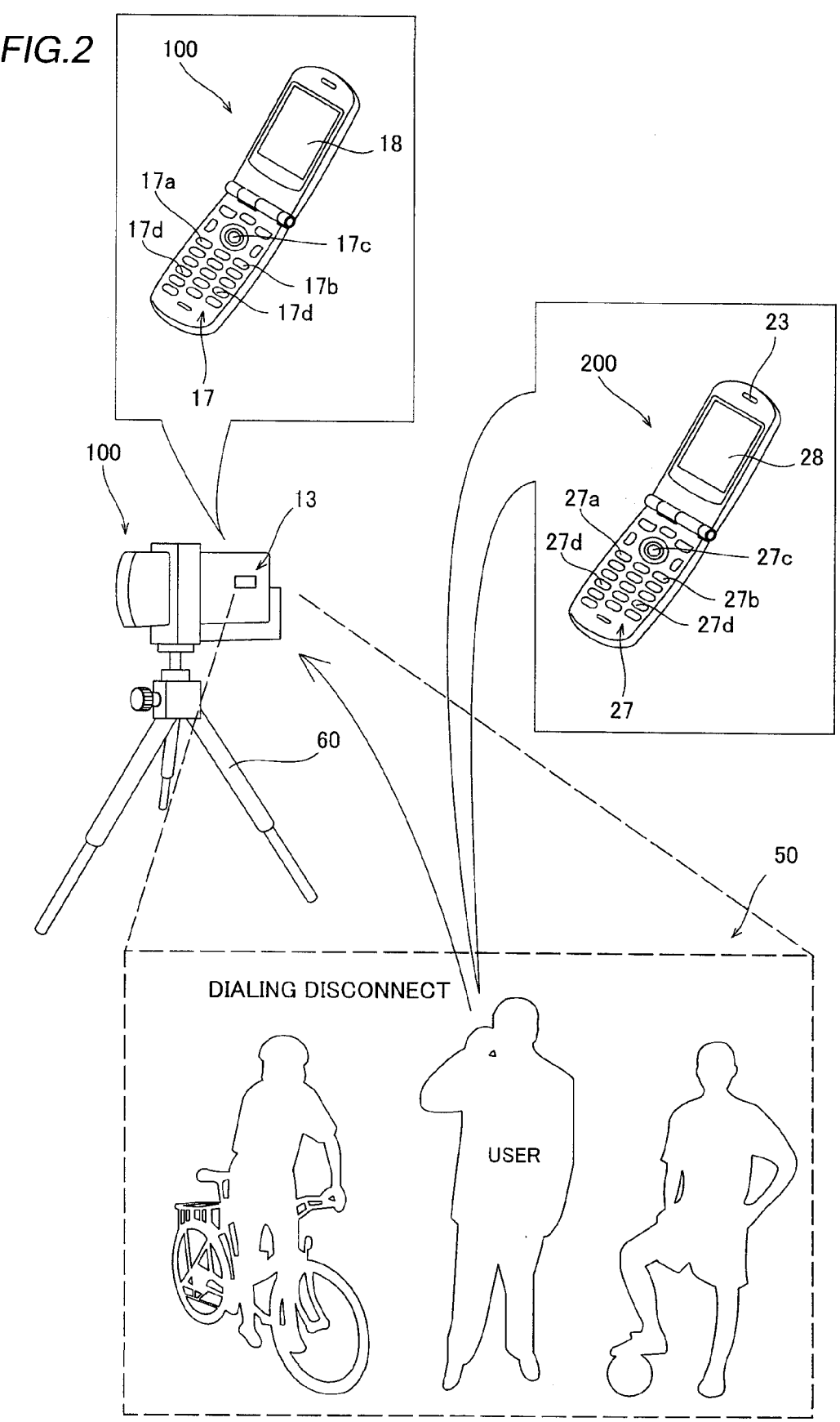
FIG. 2 illustrates the remote imaging employing the imaging system employing the mobile phones shown in FIG. 1.

As shown in FIG. 1, the imaging system employing a mobile phone according to the first embodiment of the present invention is constituted by the camera-side mobile phone 100 for acquiring an image of objects 50 and the operating-side mobile phone 200 for remote-controlling the camera-side mobile phone 100. As shown in FIGS. 1 and 2, the camera-side mobile phone 100 is formed to be settable on a tripod 60. The imaging system according to the first embodiment is so formed that the operating-side mobile phone 200 for performing remote control in a remote imaging mode described later can be set in the camera-side mobile phone 100, as shown in FIG. 1. The imaging system according to the first embodiment is so formed that the image of the objects 50 can be acquired by an operation of a user on the operating-side mobile phone 200 set in the camera-side mobile phone 100, as shown in FIG. 2.

Figure 3:
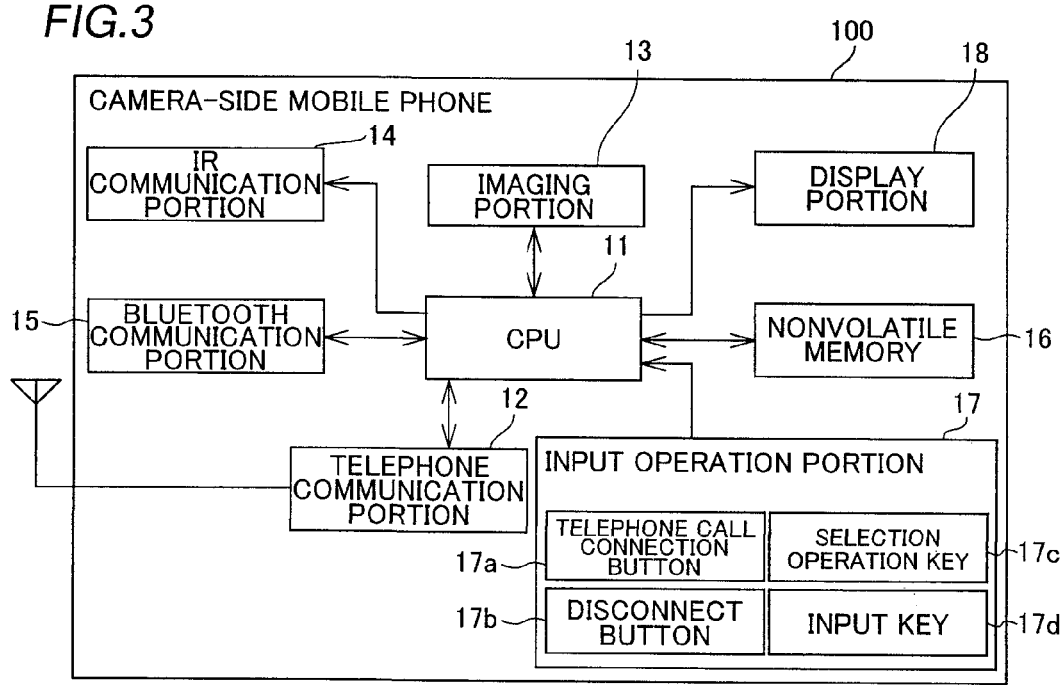
FIG. 3 is a block diagram for illustrating the structure of the mobile phone performing an imaging operation in the imaging system employing the mobile phones shown in FIG. 1.

Specifically, the camera-side mobile phone 100 according to the first embodiment of the present invention is a mobile phone having an imaging function (camera function) comprising a CPU 11, a telephone communication portion 12, an imaging portion 13 performing an imaging operation, an IR (infrared) communication portion 14, a Bluetooth communication portion 15, a nonvolatile memory 16, an input operation portion 17 and a display portion 18, as shown in FIG. 3. The CPU 11 is an example of the "control portion" in the present invention, and the telephone communication portion 12 is examples of the "first communication portion" and the "communication portion" in the present invention. Each of the IR (infrared) communication portion 14 and the Bluetooth communication portion 15 is an example of the "second communication portion" in the present invention.

The CPU 11 has a function of controlling the camera-side mobile phone 100. The CPU is described later in more detail. The telephone communication portion 12 is formed to be capable of transmitting/receiving radio waves to/from a base station of a mobile phone company (not shown) and to be capable of making telephone communication with another outside line telephone such as the operating-side mobile phone 200 (see FIG. 4) through the base station (not shown).

Each of the IR (infrared) communication portion 14 and the Bluetooth communication portion 15 is formed to be capable of transmitting/receiving data to/from an external device such as the operating-side mobile telephone 200 (see FIG. 4) through radio communication by a method other than the telephone communication. Specifically, each of the IR (infrared) communication portion 14 and the Bluetooth communication portion 15 has a function of receiving a telephone number, a mail address and the like of the operating-side mobile phone 200 or transmitting a telephone number, a mail address and the like of the camera-side mobile phone 100 to the connected external device or the like.

The nonvolatile memory 16 has a function of storing the telephone number of the camera-side mobile phone 100 itself, a telephone number of another mobile phone such as the operating-side mobile phone 200, a control program of the CPU 11, image data captured by the imaging portion 13 and the like.

The input operation portion 17 includes a plurality of buttons such as a telephone call connection button 17*a*, a disconnect button 17*b*, a selection operation key 17*c* and input keys 17*d*, as shown in FIG. 3. The telephone call connection button 17*a* is a button enabling a telephone call with the outside due to a user's pressing operation when taking a telephone call from the outside. The selection operation key 17*c* is a key for selecting one menu from a plurality of menu selection displays displayed on the display portion 18, and selecting and determining the selected menu. Thus, the camera-side mobile phone 100 is so formed that a user can switch the CPU 11 to the remote imaging mode described later by performing a prescribed operation on the selection operation key 17*c*. Further, the camera-side mobile phone 100 is so formed that the user can select identification information of the operating-side mobile phone 200 employed for remote imaging from a plurality of identification data previously stored in a telephone directory with the selection operation key 17*c*. The input keys 17*d* are formed to be capable of being operated by the user when inputting the identification information (telephone number) of the operating-side mobile phone 200 employed for remote imaging.

The display portion 18 has a function of displaying an operation screen for a user to operate the camera-side mobile phone 100 and an image captured by the imaging portion 13.

According to the first embodiment, the CPU 11 of the camera-side mobile phone 100 is so formed that the imaging portion 13 can perform an imaging operation on the basis of an operation of a user on the operating-side mobile phone 200 in the remote imaging mode described later.

The CPU 11 is formed to control the camera-side mobile phone 100 in a telephone mode enabling a telephone call. The CPU 11 is formed to control the camera-side mobile phone 100 in an imaging mode allowing the imaging portion 13 to execute an imaging operation. This imaging mode can switch from the telephone mode by an operation of a user on the selection operation key 17*c* or the like of the input operation portion 17. The CPU 11 is formed to control the camera-side mobile phone 100 in the remote imaging mode allowing the imaging portion 13 to execute an imaging operation when the camera-side mobile phone 100 has taken a telephone call from the operating-side mobile phone 200 and the CPU 11 thereafter detects that the made telephone call has been disconnected by the user in addition to the telephone mode and the imaging mode.

According to the first embodiment, the CPU 11 is formed to control the imaging portion 13 to execute an imaging operation when detecting that a communication state established by taking a telephone call has been disconnected by a user during a period after repeating a ringtone five times and before repeating the ringtone sixth times in taking the telephone call. The five times, which is the number of times the aforementioned ringtone is repeated, is an example of the "first number of times" in the present invention. The six times, which is the number of the aforementioned ringtone is repeated, is an example of the "second number of times" in the present invention.

According to the first embodiment, the CPU 11 is formed to control the imaging portion 13 to execute an imaging operation when taking a telephone call from the operating-side mobile phone 200 (see FIG. 4) corresponding to the identification information (telephone number) previously acquired by the IR (infrared) communication portion 14, the Bluetooth communication portion 15 or the like and detecting that the telephone call has been disconnected by a user in the remote imaging mode. In other words, the CPU 11 is formed to control a telephone call from a mobile phone different from the operating-side mobile phone 200 corresponding to the previously acquired identification information (telephone number) to be refused when having the telephone call from the mobile phone in the remote imaging mode.

The structure of the operating-side mobile phone 200 is now described.

Figure 4:
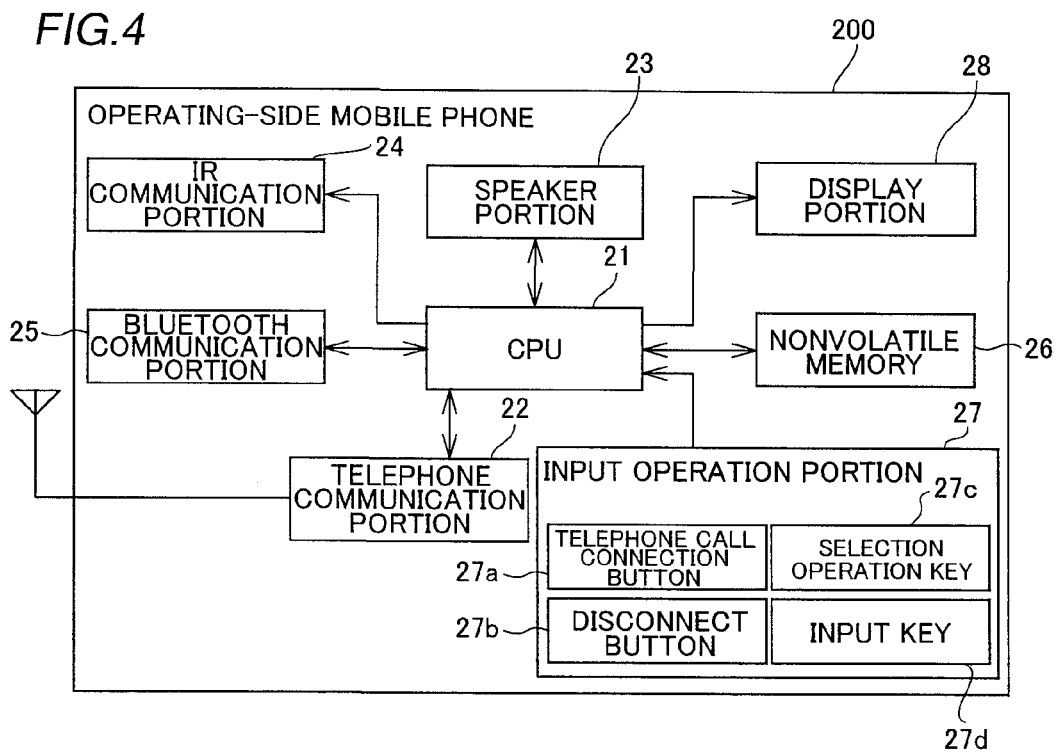
FIG. 4 is a block diagram for illustrating the structure of an operating-side mobile phone in the imaging system employing the mobile phones shown in FIG. 1.

The operating-side mobile phone 200 according to the first embodiment of the present invention is a mobile phone comprising a CPU 21, a telephone communication portion 22, a speaker portion 23 outputting received voice, a ring-back tone and the like, an IR (infrared) communication portion 24, a Bluetooth communication portion 25, a nonvolatile memory 26, an input operation portion 27 and a display portion 28, as shown in FIG. 4.

The CPU 21 has a function of controlling the operating-side mobile phone 200. The telephone communication portion 22 is formed to be capable of transmitting/receiving radio waves to/from a base station of a mobile phone company (not shown) and to be capable of making telephone communication with another outside line telephone such as the aforementioned camera-side mobile phone 100 (see FIG. 3) through the base station (not shown).

According to the first embodiment, the speaker portion 23 has a function of outputting a repeatedly sounded ring-back tone when making a telephone call from the operating-side mobile phone 200 to an outside line telephone such as the camera-side mobile phone 100. Thus, a user can hear the repeatedly sounded ring-back tone from the speaker portion 23 of the operating-side mobile phone 200 when making a telephone call from the operating-side mobile phone 200 to the camera-side mobile phone 100 in the aforementioned remote imaging mode, and hence the user can count the number of times the ring-back tone is sounded. The number of times a ringtone is repeatedly received by the camera-side mobile phone 100 corresponds to the number of times a ring-back tone is repeatedly sounded by the operating-side mobile phone 200. Consequently, the user can count the number of times a ring-back tone is repeatedly sounded from the speaker portion 23 and perform a shutter operation of the imaging portion 13 of the camera-side mobile phone 100 by pressing a disconnect button 27*b* during a period after repeating a ring-back tone five times and before repeating the ring-back tone six times.

Each of the IR (infrared) communication portion 24 and the Bluetooth communication portion 25 is formed to be capable of transmitting/receiving data to/from an external device such as the camera side mobile telephone 100 through radio communication by a method other than the telephone communication. Specifically, the IR (infrared) communication portion 24 is formed to start on the basis of an operation of a user, and is formed to transmit the identification information of the operating-side mobile phone 200 such as the telephone number and the mail address to the IR (infrared) communication portion 14 of the camera-side mobile phone 100 when receiving a data request from the IR (infrared) communication portion 14 in a case where the IR (infrared) communication portion 24 is running. The Bluetooth communication portion 25 is so formed that a pairing passkey can be previously set to allow data communication with the aforementioned Bluetooth communication portion 15 of the camera-side mobile phone 100. When the pairing passkey is previously set with respect to the Bluetooth communication portion 15 of the camera-side mobile phone 100 and the Bluetooth communication portion 25 of the operating-side mobile phone 200, therefore, the operating-side mobile phone 200 can transmit the identification information such as the telephone number and the mail address thereof to the camera-side mobile phone 100.

The nonvolatile memory 26 has a function of storing different types of data such as the telephone number of the operating-side mobile phone 200 itself, the telephone number of the camera-side mobile phone 100 or the like and a control program of the CPU 21.

The input operation portion 27 includes a plurality of buttons such as a telephone call connection button 27a, the disconnect button 27b, a selection operation key 27c and input keys 27d. The telephone call connection button 27a is a button enabling a telephone call with the outside due to a user's pressing operation when taking a telephone call from the outside and turning on outside line connection. The disconnect button 27b is a button enabling disconnection of each communication state due to a user's pressing operation when each of the states is in an on-state. The selection operation key 27c is a key employed in performing an operation for starting the IR (infrared) communication portion 24 and the Bluetooth communication portion 25, and the like to transmit the identification information (telephone number) of the operating-side mobile phone 200 to the camera-side mobile phone 100.

The display portion 28 has a function of displaying an operation screen for a user to operate the operating-side mobile phone 200.

A control flow of the camera-side mobile phone 100 in the remote imaging mode according to the first embodiment of the present invention is now described with reference to FIGS. 1 to 5.

Figure 5:
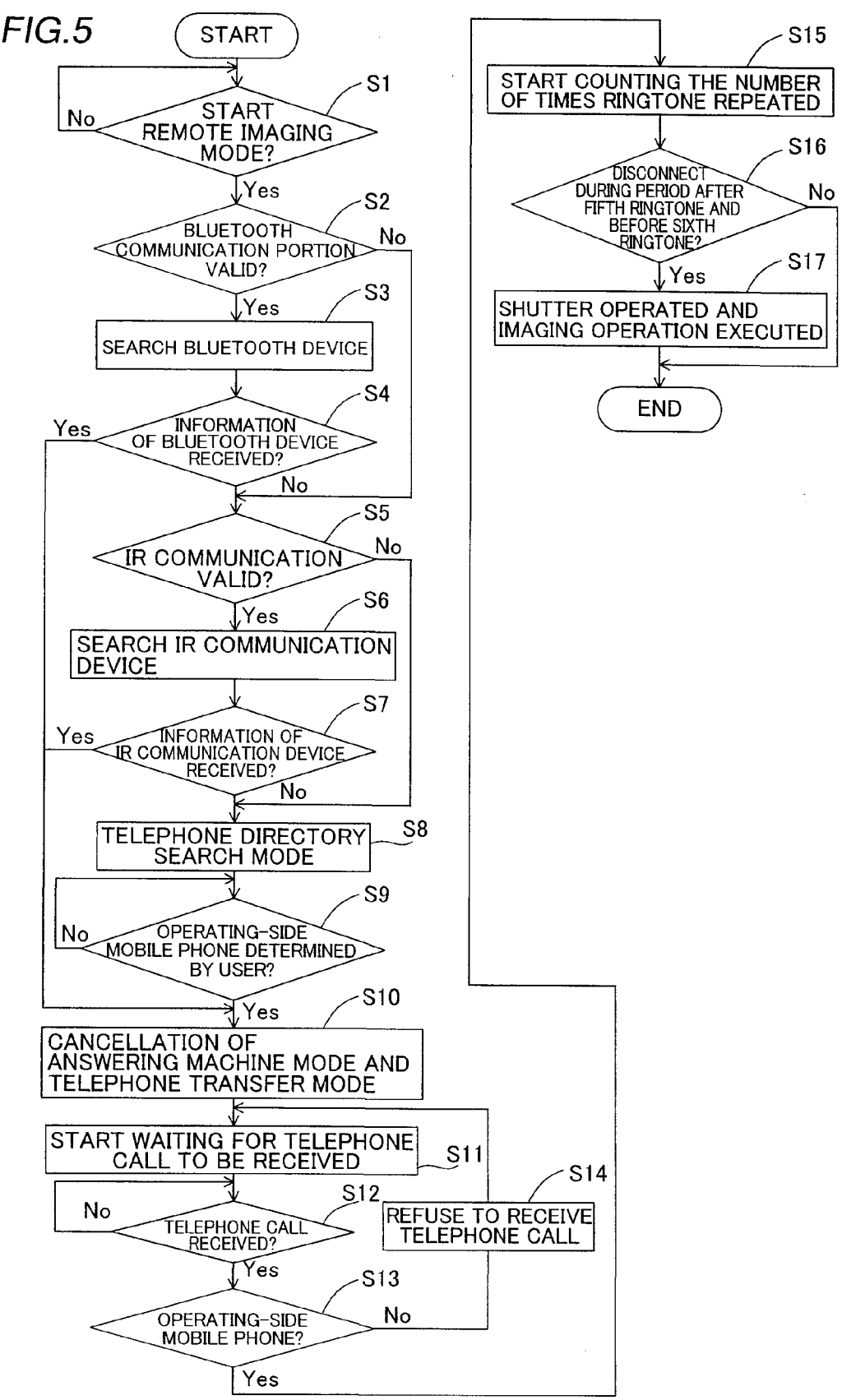
FIG. 5 is a flow chart for illustrating a control flow of a camera-side mobile phone in the imaging system employing the mobile phones shown in FIG. 1, performing processing in a remote imaging mode.

As shown in FIG. 5, the CPU 11 (see FIG. 3) determines whether or not the remote imaging mode is activated at a step S1. A user sets the remote imaging mode by operating the aforementioned selection operation key 17c. This determination is repeated until the remote imaging mode is activated. When determining that the remote imaging mode is activated at the step S1, the process advances to a step S2.

The CPU 11 determines whether or not the Bluetooth communication portion 15 is valid at the step S2. When determining that the Bluetooth communication portion 15 is not valid at the step S2, the process advances to a step S5 described later. When determining that the Bluetooth communication portion 15 is valid at the step S2, the process advances to a step S3.

The CPU 11 searches whether or not there is a Bluetooth device like the operating-side mobile phone 200 having the Bluetooth communication portion 25 nearby as shown in FIG. 1 at the step S3, and the process advances to a step S4. Specifically, the CPU 11 searches the presence of the operating-side mobile phone 200 having the Bluetooth communication portion 25 in which the same pairing passkey as the Bluetooth communication portion 15 has been set when the pairing passkey has been previously set in the Bluetooth communication portion 15.

As shown in FIG. 5, the CPU 11 determines whether or not the device identification information such as the mobile phone number and the mobile phone mail address has been received from the operating-side mobile phone 200 in which the same pairing passkey as the Bluetooth communication portion 15 has been set at the step S4. When determining that the device identification information such as the mobile phone number and the mobile phone mail address has been received from the operating-side mobile phone 200 (Bluetooth device) at the step S4, the process advances to a step S10 described later. When determining that the device identification information such as the mobile phone number and the mobile phone mail address has not been received from the operating-side mobile phone 200 (Bluetooth device) at the step S4, the process advances to a step S5.

The CPU 11 determines whether or not the IR (infrared) communication portion 14 is valid at the step S5. When determining that the IR (infrared) communication portion 14 is not valid at the step S5, the process advances to a step S8 described later. When determining that the IR (infrared) communication portion 14 is valid at the step S5, the process advances to a step S6.

The CPU 11 searches whether or not there is an IR communication device like the operating-side mobile phone 200 having the IR (infrared) communication portion 24 nearby as shown in FIG. 1 at the step S6, and the process advances to a step S7. Specifically, a data request is transmitted from the IR (infrared) communication portion 14 of the camera-side mobile phone 100 when the IR (infrared) communication portion 24 of the operating-side mobile phone 200 starts on the basis of an operation of the user and a state where the identification information (telephone number) of the operating-side mobile phone 200 can be transmitted is set. As shown in FIG. 5, the CPU 11 determines whether or not the device identification information such as the mobile phone number and the mobile phone mail address has been received from the operating-side mobile phone 200 in which the IR (infrared) communication portion 24 is running at the step S7. In other words, the CPU 11 determines whether or not the identification information of the operating-side mobile phone 200 such as the telephone number and the mail address has been transmitted from the IR (infrared) communication portion 24 of the operating-side mobile phone 200 to the IR (infrared) communication portion 14 of the camera-side mobile phone 100 in response to the data request by the IR (infrared) communication portion 14 of the camera-side mobile phone 100. When determining that the device identification information such as the mobile phone number and the mobile phone mail address has been received from the operating-side mobile phone 200 (IR communication device) at the step S7, the process advances to the step S10 described later. When determining that the device identification information such as the mobile phone number and the mobile phone mail address has not been received from the operating-side mobile phone 200 (IR communication device) at the step S7, the process advances to the step S8.

The camera-side mobile phone 100 is formed to be capable of automatically acquiring the identification information of the operating-side mobile phone 200 employed for remote imaging by radio communication means like the IR (infrared) communication portion 14 and the Bluetooth communication portion 15 as the aforementioned processes of the step S2 to S8. Thus, the operating-side mobile phone 200 employed for remote imaging can be set in the camera-side mobile phone 100 without complicated operations.

Thereafter, a telephone directory search mode starts at the step S8. In other words, the CPU 11 starts the telephone directory search mode and allows the user to select the identification information (telephone number) of the operating-side mobile phone 200 employed for remote imaging from the plurality of identification data previously stored in the telephone directory since the CPU 11 was unable to automatically acquire the identification information (telephone number) of the operating-side mobile phone 200 employed for remote imaging by the aforementioned radio communication means.

The CPU 11 determines whether or not the operating-side mobile phone 200 has been determined by user's selection of the identification information (telephone number) of the operating-side mobile phone 200 employed for remote imaging from the plurality of identification data previously stored in the telephone directory at a step S9. The determination of the step S9 is repeated until the operating-side mobile phone 200 is determined. When the operating-side mobile phone 200 has been determined at the step S9, the process advances to the step S10.

Thereafter, the identification information of the operating-side mobile phone 200 has been acquired through the process of the aforementioned step S4, S7 or S9, so that an answering machine mode and a telephone transfer mode are cancelled at the step S10, and the process advances to a step S11. The CPU 11 starts waiting for a telephone call to be received at the step S11, and the process advances to a step S12.

The CPU 11 determines whether or not the camera-side mobile phone 100 has taken a telephone call from the operating-side mobile phone 200 at the step S12. In other words, whether or not a telephone call has been made to the camera-side mobile phone 100 is detected by the user pressing the telephone call connection button 27a (see FIG. 1) of the operating-side mobile phone 200 employed for a remote operation. The determination of the step S12 is repeated until the camera-side mobile phone 100 takes a telephone call from the operating-side mobile phone 200, and when taking a telephone call from the operating-side mobile phone 200, the process advances to a step S13.

The CPU 11 determines whether or not identification information of a caller is the same as the identification information of the operating-side mobile phone 200 acquired through the aforementioned step S4, S7 or S9 at the step S13. When determining that the identification information of the caller is not the same as the identification information (telephone number) of the operating-side mobile phone 200 acquired through the aforementioned step S4, S7 or S9 at the step S13, the process advances to a step S14, and the process returns to the step S11 after refusing to receive the telephone call. When determining that the identification information of the caller is the same as the identification information (telephone number) of the operating-side mobile phone 200 acquired through the aforementioned step S4, S7 or S9 at the step S13, the process advances to a step S15.

Thereafter, the number of times a ringtone is received when taking the telephone call is counted at the step S15. At this time, the user moves from the camera-side mobile phone 100 to a position shown in FIG. 2 in order to become the object 50 while counting the number of times a ring-back tone is sounded from the speaker portion 23, as shown in FIG. 1. The CPU 11 determines whether or not a communication state established by taking the telephone call has been disconnected during a period after repeating a ringtone five times and before repeating the ringtone six times in taking the telephone call at a step S16. In other words, the CPU 11 determines whether or not the user has pressed the disconnect button 27b of the operating-side mobile phone 200. When determining (detecting) that the taken telephone call has been disconnected during the period after repeating the ringtone five times and before repeating the ringtone six times in taking the telephone call at the step S16, the process advances to a step S17. At the step S17, a shutter (not shown) of the imaging portion 13 is operated, and processing of the CPU 11 is terminated after performing an imaging operation. When determining (detecting) that the taken telephone call has not been disconnected during the period after repeating the ringtone five times and before repeating the ringtone six times in taking the telephone call at the step S16, the processing of the CPU 11 is terminated without an imaging operation performed by the imaging portion 13.

According to the first embodiment, as hereinabove described, the CPU 11 controlling the imaging portion 13 to execute an imaging operation when detecting that a communication state established by taking a telephone call has been disconnected by a user after repeating a ringtone five times in taking the telephone call in a case where the telephone call has been made from the operating-side mobile phone 200 to the telephone communication portion 12 is provided so that the CPU 11 controls the imaging portion 13 to execute an imaging operation in a state where a communication state after the telephone communication portion 12 once takes the telephone call is established, and hence the camera-side mobile phone 100 can equalize timing of an imaging operation of a camera unlike a mobile phone performing an imaging operation of a camera when taking a telephone call. Further, the CPU 11 controlling the imaging portion 13 to execute an imaging operation when detecting that a communication state established by taking a telephone call has been disconnected by a user after repeating a ringtone five times in taking the telephone call is provided so that the imaging portion 13 can execute an imaging operation without an operation for establishing a telephone state with a caller and an operation for performing an imaging operation as well as a complicated operation for transmitting control commands. Thus, the number of operations that a user performs can be reduced. Consequently, timing of an imaging operation of a camera can be equalized while simplifying user's operations.

According to the first embodiment, as hereinabove described, the CPU 11 is formed to control the imaging portion 13 to execute an imaging operation when detecting that the taken telephone call has been disconnected during the period after repeating the ringtone five times and before repeating the ringtone six times in taking the telephone call, whereby the imaging portion 13 is allowed to execute an imaging operation only during the period, and hence an imaging operation of a camera can be performed at a prescribed timing during the period.

According to the first embodiment, as hereinabove described, the camera-side mobile phone 100 is formed to be capable of communicating with the operating-side mobile phone 200 by a method other than telephone communication, the IR (infrared) communication portion 14 and the Bluetooth communication portion 15 capable of acquiring the identification information of the operating-side mobile phone 200 are provided and the CPU 11 is formed to control the imaging portion 13 to execute an imaging operation when detecting that a communication state with the operating-side mobile phone 200 corresponding to the identification information previously acquired by the IR (infrared) communication portion 14 and the Bluetooth communication portion 15 has been disconnected, whereby the imaging portion 13 does not execute an imaging operation even when taking a telephone call from a mobile phone not corresponding to the identification information previously acquired by the IR (infrared) communication portion 14 and the Bluetooth communication portion 15, and hence an imaging operation of a camera due to an unexpected telephone call can be inhibited.

According to the first embodiment, as hereinabove described, the CPU 11 is formed to be capable of accepting the identification information of the operating-side mobile phone 200 inputted by the user when the CPU 11 is incapable of acquiring the identification information of the operating-side mobile phone 200 through the IR (infrared) communication portion 14 and the Bluetooth communication portion 15, whereby the user can take a photograph with the operating-side mobile phone 200 that the IR (infrared) communication portion 14 and the Bluetooth communication portion 15 cannot communicate with by operating the camera-side mobile phone 100 performing an imaging operation and selecting the identification information of the operating-side mobile phone 200 incapable of communicating with the IR (infrared) communication portion 14 and the Bluetooth communication portion 15, also when the user would like to take a photograph with the operating-side mobile phone 200 that the IR (infrared) communication portion 14 and the Bluetooth communication portion 15 cannot communicate with.

According to the first embodiment, as hereinabove described, the CPU 11 is formed to perform control of refusing a telephone call from an operating-side mobile phone having identification information different from the previously acquired identification information when identification information of the operating-side mobile phone making the telephone call is different from the previously acquired identification information of the operating-side mobile phone 200, whereby an imaging operation of a camera based on the telephone call from the operating-side mobile phone having identification information different from the previously acquired identification information can be prevented.

(Second Embodiment)

Next, the structure of an imaging system constituted by a camera-side mobile phone 300 and an operating-side mobile phone 200 according to a second embodiment of the present invention is described with reference to FIGS. 4 and 6. The camera-side mobile phone 300 is examples of the "imaging side mobile phone" and the "mobile phone" in the present invention. In the imaging system employing the mobile phones according to the second embodiment, an imaging portion 13 is formed to execute an imaging operation when detecting that a telephone call making from the camera-side mobile phone 300 to the operating-side mobile phone 200 has been disconnected with the operating-side mobile phone 200 by a user after making the telephone call, unlike in the imaging system employing the mobile phones according the aforementioned first embodiment.

Figure 6:
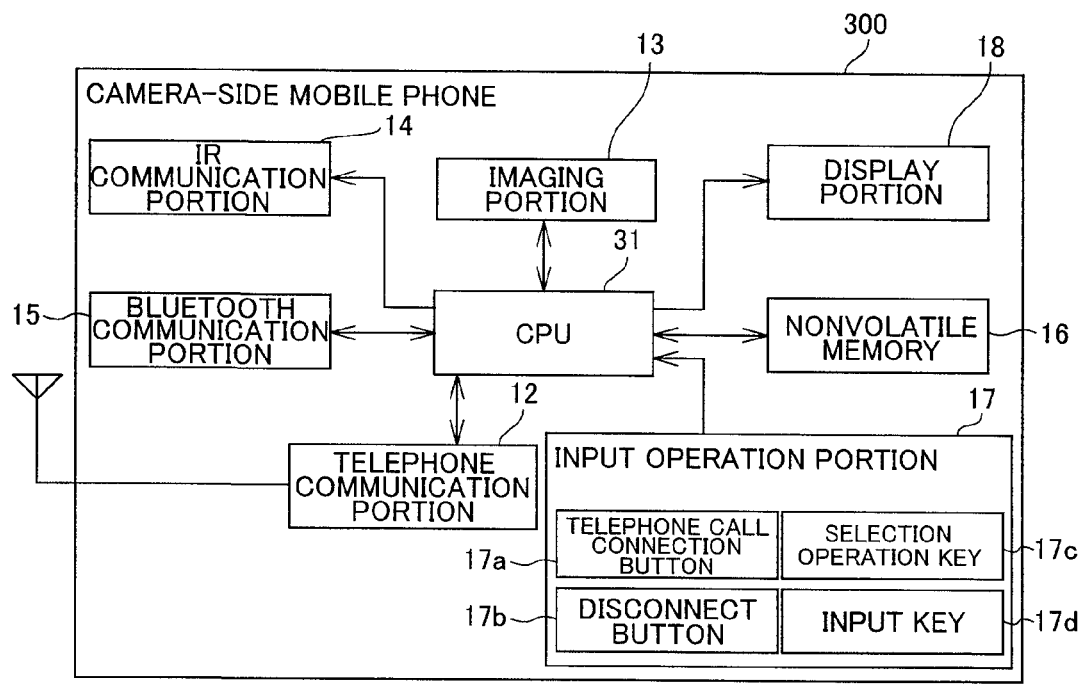
FIG. 6 is a block diagram for illustrating the structure of a camera-side mobile phone in an imaging system employing mobile phones according to a second embodiment of the present invention.

The camera-side mobile phone 300 according to the second embodiment of the present invention is a mobile phone having an imaging function (camera function) comprising a CPU 31 and a telephone communication portion 12, the imaging portion 13 performing an imaging operation of a camera, an IR (infrared) communication portion 14, a Bluetooth communication portion 15, a nonvolatile memory 16, an input operation portion 17 and a display portion 18 similarly to the aforementioned first embodiment, as shown in FIG. 6. The CPU 31 is an example of the "control portion" in the present invention, and the telephone communication portion 12 is examples of the "first communication portion" and the "communication portion" in the present invention.

According to the second embodiment, the CPU 31 is formed to control the camera-side mobile phone 300 in a remote imaging mode allowing the imaging portion 13 to execute an imaging operation when detecting that telephone communication established by making a telephone call from the camera-side mobile phone 300 to the operating-side mobile phone 200 (see FIG. 4) has been disconnected with the operating-side mobile phone 200 by a user after making the telephone call in addition to a telephone mode and an imaging mode.

According to the second embodiment, the CPU 31 is formed to control the imaging portion 13 to execute an imaging operation when detecting that telephone communication established by making a telephone call has been disconnected with the operating-side mobile phone 200 by a user during a period after repeating a ring-back tone five times and before repeating the ring-back tone six times in making the telephone call.

According to the second embodiment, the CPU 31 is formed to control the imaging portion 13 to execute an imaging operation when making a telephone call to the operating-side mobile phone 200 (see FIG. 4) corresponding to identification information previously acquired by the IR (infrared) communication portion 14, the Bluetooth communication portion 15 and the like and disconnecting the made telephone call with the operating-side mobile phone 200 in the remote imaging mode.

The remaining structure of the imaging system employing the mobile phones according to the second embodiment other than the aforementioned structure is similar to the structure of the imaging system employing the mobile phones according to the aforementioned first embodiment, and therefore redundant description of the structure is omitted.

A control flow of the camera-side mobile phone 300 in the remote imaging mode according to the second embodiment of the present invention is now described with reference to FIGS. 4, 6 and 7. The control flow at steps S1 to S9 is the same as the control flow at the steps S1 to S9 of the camera-side mobile phone 100 in the aforementioned first embodiment, and hence redundant description is omitted.

Figure 7:
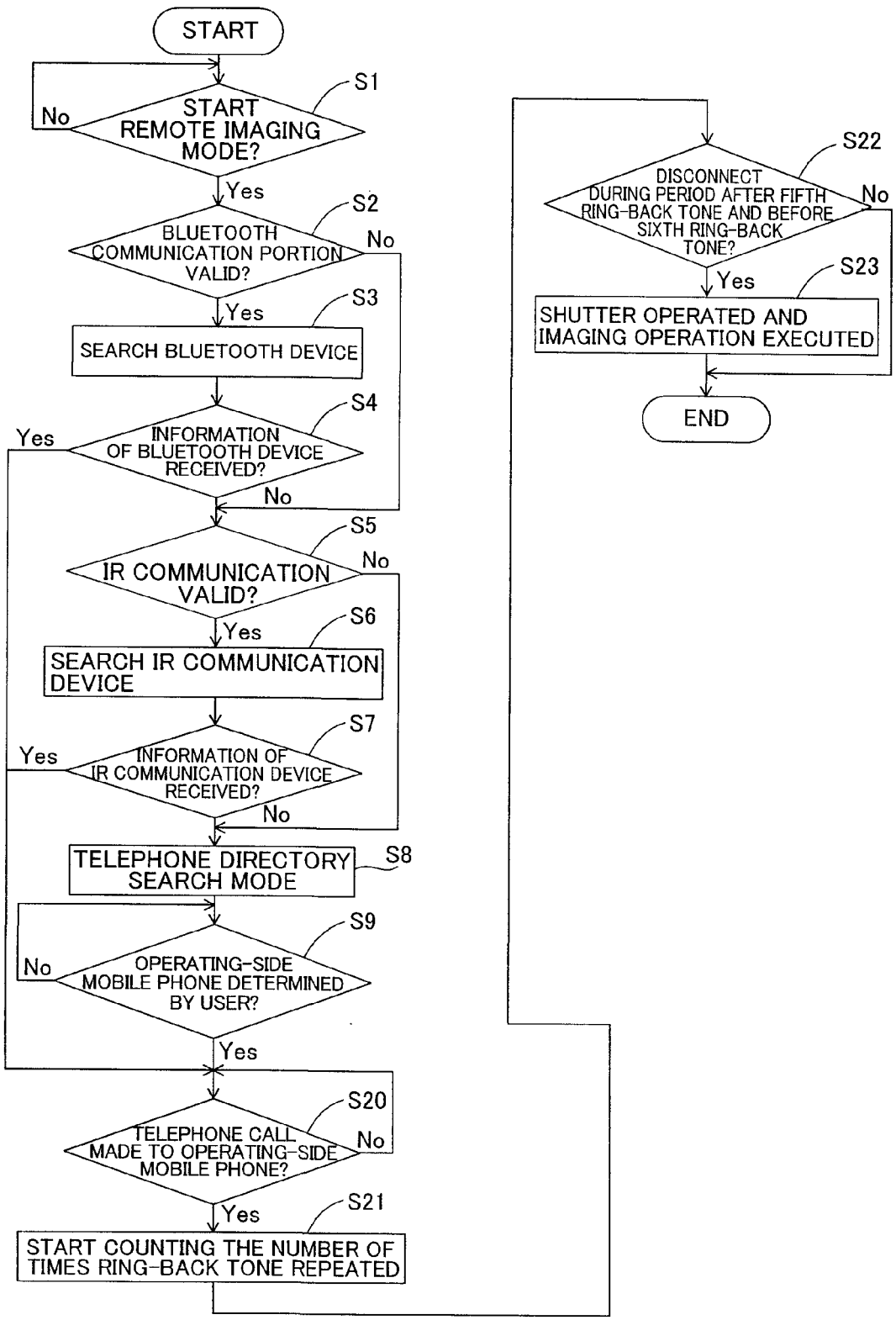
FIG. 7 is a flow chart for illustrating a control flow of the camera-side mobile phone in the imaging system employing the mobile phones according to the second embodiment of the present invention, performing processing in a remote imaging mode.

As shown in FIG. 7, the CPU 31 determines whether or not a telephone call has been made to the operating-side mobile phone 200 (see FIG. 4) corresponding to identification information (telephone number) acquired through a step S4, S7 or S9 at a step S20 after the step S9. In other words, the CPU 31 detects whether or not a user has pressed a telephone call connection button 17*a* (see FIG. 6) of the camera-side mobile phone 300 to make a telephone call to the operating-side mobile phone 200. The determination of the step S20 is repeated until a telephone call is made to the operating-side mobile phone 200 corresponding to the acquired identification information (telephone number), and when a telephone call has been made to the operating-side mobile phone 200 corresponding to the acquired identification information (telephone number), the process advances to a step S21.

Thereafter, the number of times a ring-back tone is transmitted when making the telephone call is counted at the step S21. At this time, the user moves to a prescribed position in order to become an object 50 while counting the number of times a ringtone is received by the operating-side mobile phone 200. The CPU 31 determines whether or not a communication state established by making the telephone call from the camera-side mobile phone 300 has been disconnected by the operating-side mobile phone 200, which is a receiver, during a period after repeating the ring-back tone five times and before repeating the ring-back tone six times in making the telephone call at a step S22. In other words, the CPU 31 determines whether or not the user has pressed a disconnect button 27*b* of the operating-side mobile phone 200. When determining (detecting) that the telephone call made by the camera-side mobile phone 300 has been disconnected by the operating-side mobile phone 200, which is a receiver, during the period after repeating the ring-back tone five times and before repeating the ring-back tone six times in making the telephone call at the step S22, the process advances to a step S23. At the step S23, a shutter (not shown) of the imaging portion 13 is operated, and processing of the CPU 31 is terminated after performing an imaging operation. When determining (detecting) that the telephone call made by the camera-side mobile phone 300 has not been disconnected by the operating-side mobile phone 200, which is a receiver, during the period after repeating the ring-back tone five times and before repeating the ring-back tone six times in making the telephone call at the step S22, the processing of the CPU 31 is terminated without an imaging operation performed by the imaging portion 13.

According to the second embodiment, as hereinabove described, the CPU 31 controlling the imaging portion 13 to execute an imaging operation when detecting that a communication state established by making a telephone call has been disconnected by a user after repeating a ring-back tone five times in making the telephone call in a case where the telephone call has been made to the operating-side mobile phone 200 is provided so that the CPU 31 controls the imaging portion 13 to execute an imaging operation in a state where a communication state after once making the telephone call is established, and hence the camera-side mobile phone 300 can equalize timing of an imaging operation of a camera unlike a mobile phone performing an imaging operation of a camera when making a telephone call. Further, the CPU 31 controlling the imaging portion 13 to execute an imaging operation when detecting that a communication state established by making a telephone call has been disconnected by a user after repeating a ring-back tone five times in making the telephone call is provided so that the imaging portion 13 can execute an imaging operation without an operation for establishing a telephone state with the operating-side mobile phone 200 (receiver) and an operation for performing an imaging operation as well as a complicated operation for transmitting control commands. Thus, the number of operations that a user performs can be reduced. Consequently, timing of an imaging operation of a camera can be equalized while simplifying user's operations.

According to the second embodiment, as hereinabove described, the CPU 31 is formed to control the imaging portion 13 to execute an imaging operation when detecting that the made telephone call has been disconnected during the period after repeating the ring-back tone five times and before repeating the ring-back tone six times in making the telephone call, whereby the imaging portion 13 is allowed to execute an imaging operation only during the period after repeating the ring-back tone five times and before repeating the ring-back tone six times, and hence an imaging operation of a camera can be performed at a prescribed timing during the period.

Although the present invention has been described and illustrated in detail, it is clearly understood that the same is by way of illustration and example only and is not to be taken by way of limitation, the spirit and scope of the present invention being limited only by the terms of the appended claims.

For example, while the imaging portion is allowed to execute an imaging operation when detecting that a taken telephone call and a made telephone call have been disconnected during a period after repeating a ringtone five times and before repeating a ringtone six times in taking the telephone call and a period after repeating a ring-back tone five times and before repeating a ring-back tone six times in making the telephone call, respectively in each of the aforementioned first and second embodiments, the present invention is not restricted to this. The imaging portion may be allowed to perform an imaging operation at the detected timing any time in so far as it is detected that the taken telephone call and the made telephone call have been disconnected after repeating the ringtone at least five times in taking the telephone call and the ring-back tone at least five times in making the telephone call, for example.

While the identification information of the operating-side mobile phone is acquired through the IR (infrared) communication portion and the Bluetooth communication portion in each of the aforementioned first and second embodiments, the present invention is not restricted to this. The identification information of the operating-side mobile phone may alternatively be acquired through radio communication other than the IR (infrared) communication portion and the Bluetooth communication portion, such as wireless LAN like IEEE 802.11, for example. Alternatively, the identification information of the operating-side mobile phone may be acquired through wired cable communication such as a USB cable and IEEE 1394.

While the IR (infrared) communication portion and the Bluetooth communication portion are provided in the operating-side mobile phone in each of the aforementioned first and second embodiments, the present invention is not restricted to this. The operating-side mobile phone may not have the IR (infrared) communication portion and the Bluetooth communication portion, so far as the operating-side mobile phone is a mobile phone enabling a user to select previously stored identification information, for example. Alternatively, the operating-side mobile phone may be a mobile phone enabling a user to manually input the identification information through the input keys or the like.

While the IR (infrared) communication portion of the camera-side mobile phone acquires the identification information of the operating-side mobile phone by a user's operation to start the IR (infrared) communication portion of the operating-side mobile phone in the aforementioned first embodiment, the present invention is not restricted to this. In the present invention, the IR (infrared) communication portion of the operating-side mobile phone may alternatively is formed to automatically start and automatically transmit the identification information thereof to the IR (infrared) communication portion of the camera-side mobile phone when the IR (infrared) communication portion of the camera-side mobile phone searches another IR (infrared) communication portion, even if there is no operation of a user.

While the imaging portion is allowed to execute an imaging operation when the numbers of times a ringtone and a ring-back tone are repeated in taking and making a telephone call are five times in each of the aforementioned first and second embodiments, the present invention is not restricted to this. In the present invention, the numbers of times a ringtone and a ring-back tone are repeated in taking and making a telephone call may be any numbers of times, and the plural numbers of times are preferred. Alternatively, a user may be enabled to vary the numbers of times a ringtone and a ring-back tone are repeated in taking and making a telephone call allowing the image portion to execute an imaging operation.

What is claimed is:

1. A mobile phone comprising:
a first communication portion operatively configured for telephone communication;
an imaging portion;
a control portion controlling said imaging portion to execute an imaging operation when detecting that a communication state established by making a telephone call or taking a telephone call has been disconnected by a user's disconnection operation with respect to an operating-side mobile phone after a ring-back tone in making said telephone call or a ringtone in taking said telephone call is repeated the first number of times in a case where said first communication portion makes said telephone call to said operating-side mobile phone or said first communication portion takes said telephone call from said operating-side mobile phone; and a second communication portion operatively configured for communicating with said operating-side mobile phone by a method other than telephone communication and acquiring identification information of said operating-side mobile phone, wherein said control portion is operatively configured for acquiring said identification information of said operating-side mobile phone on the basis of selection or input of said identification information by the user when said control portion cannot acquire said identification information of said operating-side mobile phone through said second communication portion.

2. The mobile phone according to claim 1, wherein said control portion is formed to control said imaging portion to execute an imaging operation when detecting that said telephone call made by said first communication portion or said telephone call taken by said first communication portion has been disconnected by a user during a period after said ring-back tone in making said telephone call or said ringtone in taking said telephone call is repeated said first number of times and before said ring-back tone in making said telephone call or said ringtone in taking said telephone call is repeated the second number of times, which is the number of times subsequent to said first number of times.

3. The mobile phone according to claim 1, further comprising a second communication portion operatively configured for communicating with said operating-side mobile phone by a method other than telephone communication and for acquiring identification information of said operating-side mobile phone, wherein said control portion is formed to control said imaging portion to execute an imaging operation when detecting that a communication state established by making a telephone call to and taking a telephone call from said operating-side mobile phone corresponding to identification information previously acquired by said second communication portion has been disconnected by a user.

4. The mobile phone according to claim 3, wherein said identification information of said operating-side mobile phone includes at least either a telephone number or a mail address of said operating-side mobile phone.

5. The mobile phone according to claim 1, wherein the mobile phone is operatively configured for being switched to a remote imaging mode allowing said imaging portion to execute an imaging operation by remote operation from said operating-side mobile phone, wherein said control portion is formed to control said imaging portion to execute an imaging operation when detecting that said communication state established by making said telephone call or taking said telephone call has been disconnected by a user after said ring-back tone in making said telephone call or said ringtone in taking said telephone call is repeated said first number of times in said remote imaging mode.

6. The mobile phone according to claim 5, further comprising a second communication portion operatively configured for communicating with said operating-side mobile phone by a method other than telephone communication, wherein said control portion is formed to control said second communication portion to acquire identification information of said operating-side mobile phone on the basis of switch to said remote imaging mode.

7. The mobile phone according to claim 6, wherein a user can select or input said identification information of said operating-side mobile phone when said control portion cannot acquire said identification information of said operating-side mobile phone through said second communication portion, and said control portion is operatively configured for acquiring said identification information of said operating-side mobile phone on the basis of selection or input of said identification information by the user.

8. The mobile phone according to claim 1, wherein said control portion is formed to control said imaging portion to execute an imaging operation when a communication state established by taking a telephone call has been disconnected by a user after a ringtone in taking said telephone call is repeated said first number of times in a case where said first communication portion takes said telephone call.

9. The mobile phone according to claim 8, wherein the mobile phone is operatively configured for being switched to a remote imaging mode allowing said imaging portion to execute an imaging operation by remote operation from said operating-side mobile phone, further comprising a second communication portion operatively configured for communicating with said operating-side mobile phone by a method other than telephone communication and for acquiring identification information of said operating-side mobile phone, wherein said control portion is formed to refuse to take a telephone call from an operating-side mobile phone having identification information different from previously acquired identification information of said operating-side mobile phone when identification information of the operating-side mobile phone making the telephone call is different from said previously acquired identification information in said remote imaging mode.

10. The mobile phone according to claim 8, having an answering machine mode for recording a telephone call after taking the telephone call or a telephone transfer mode, wherein said control portion is formed to cancel said answering machine mode or said telephone transfer mode when acquiring identification information of said operating-side mobile phone.

11. An imaging system employing mobile phones, comprising:

an operating-side mobile phone operatively configured for telephone communication; and an imaging-side mobile phone including a first communication portion operatively configured for telephone communication, an imaging portion, a control portion controlling said imaging portion to execute an imaging operation when detecting that a communication state established by making a telephone call or taking a telephone call has been disconnected by a user's disconnection operation with respect to an operating-side mobile phone after a ring-back tone in making said telephone call or a ringtone in taking said telephone call is repeated the first number of times in a case where said first communication portion makes said telephone call to said operating-side mobile phone or said communication portion takes said telephone call from said operating-side mobile phone, and a second communication portion operatively configured for communicating with said operating-side mobile phone by a method other than telephone communication and acquiring identification information of said operating-side mobile phone, wherein said control portion is operatively configured for acquiring said identification information of said operating-side mobile phone on the basis of selection or input of said identification information by the user when said control portion cannot acquire said identification information of said operating-side mobile phone through said second communication portion.

12. The imaging system employing mobile phones according to claim 11, wherein
said control portion of said imaging-side mobile phone is formed to control said imaging portion of said imaging-side mobile phone to execute an imaging operation when detecting that said telephone call made by said first communication portion or said telephone call taken by said first communication portion has been disconnected by a user during a period after said ring-back tone in making said telephone call or said ringtone in taking said telephone call is repeated said first number of times and before said ring-back tone in making said telephone call or said ringtone in taking said telephone call is repeated the second number of times, which is the number of times subsequent to said first number of times.

13. The imaging system employing mobile phones according to claim 11, wherein
said imaging-side mobile phone further includes a second communication portion operatively configured for communicating with said operating-side mobile phone by a method other than telephone communication and for acquiring identification information of said operating-side mobile phone, and
said control portion of said imaging-side mobile phone is formed to control said imaging portion of said imaging-side mobile phone to execute an imaging operation when detecting that a communication state established by making a telephone call to and taking a telephone call from said operating-side mobile phone corresponding to identification information previously acquired by said second communication portion has been disconnected by a user.

14. The imaging system employing mobile phones according to claim 11, wherein
said imaging-side mobile phone is operatively configured for being switched to a remote imaging mode allowing said imaging portion of said imaging-side mobile phone to execute an imaging operation by remote operation from said operating-side mobile phone, and
said control portion of said imaging-side mobile phone is formed to control said imaging portion of said imaging-side mobile phone to execute an imaging operation when detecting that said communication state established by making said telephone call or taking said telephone call has been disconnected by a user after said ring-back tone in making said telephone call or said ringtone in taking said telephone call is repeated said first number of times in said remote imaging mode.

15. The imaging system employing mobile phones according to claim 11, wherein
said control portion of said imaging-side mobile phone is formed to control said imaging portion of said imaging-side mobile phone to execute an imaging operation when a communication state established by taking a telephone call has been disconnected by a user after a ringtone in taking said telephone call is repeated said first number of times in a case where said first communication portion takes said telephone call.

16. The imaging system employing mobile phones according to claim 15, wherein said imaging-side mobile phone is operatively configured for being switched to a remote imaging mode allowing said imaging portion to execute an imaging operation by remote operation from said operating-side mobile phone,
said imaging-side mobile phone further includes a second communication portion operatively configured for communicating with said operating-side mobile phone by a method other than telephone communication and for acquiring identification information of said operating-side mobile phone, and
said control portion of said imaging-side mobile phone is formed to refuse to take a telephone call from an operating-side mobile phone having identification information different from previously acquired identification information of said operating-side mobile phone when identification information of the operating-side mobile phone making the telephone call is different from said previously acquired identification information in said remote imaging mode.

17. An imaging method employing mobile phones, comprising steps of:
making a telephone call from an imaging-side mobile phone to an operating-side mobile phone or making a telephone call from said operating-side mobile phone to said imaging-side mobile phone on the basis of an operation of a user;
making an imaging portion of said imaging-side mobile phone execute an imaging operation when detecting that said telephone call made by said imaging-side mobile phone or said telephone call taken by said imaging-side mobile phone has been disconnected by a user's disconnection operation with respect to said operating-side mobile phone after a ring-back tone in making said telephone call or a ringtone in taking said telephone call is repeated the first number of times; and
communicating with said operating-side mobile phone by the imaging-side mobile phone by a method other than telephone communication, and
acquiring identification information of said operating-side mobile phone by the imaging-side mobile phone, wherein the acquiring of said identification information of said operating-side mobile phone is made on the basis of selection or input of said identification information by the user when said imaging-side mobile phone cannot acquire said identification information of said operating-side mobile phone by the method other than telephone communication.

18. The imaging method employing mobile phones according to claim 17, wherein
said step of making said imaging portion of said imaging-side mobile phone execute an imaging operation includes a step of making said imaging portion of said imaging-side mobile phone execute an imaging operation when detecting that said telephone call made by said imaging-side mobile phone or said telephone call taken by said imaging-side mobile phone has been disconnected by a user during a period after said ring-back tone in making said telephone call or said ringtone in taking said telephone call is repeated said first number of times and before said ring-back tone in making said telephone call or said ringtone in taking said telephone call is repeated the second number of times, which is the number of times subsequent to said first number of times.

19. The imaging method employing mobile phones according to claim 17, further comprising a step of previously acquiring identification information of said operating-side mobile phone by communicating with said operating-side mobile phone by a method other than telephone communication through a second communication portion of said imaging-side mobile phone in advance of said step of making said imaging portion of said imaging-side mobile phone execute an imaging operation, wherein said step of making said imaging portion of said imaging-side mobile phone execute an imaging operation includes a step of making said imaging portion of said imaging-side mobile phone execute an imaging operation when detecting that a communication state established by making said telephone call to or taking said telephone call from said operating-side mobile phone corresponding to identification information previously acquired by said second communication portion has been disconnected by a user.

20. The imaging method employing mobile phones according to claim 17, further comprising a step of switching said imaging-side mobile phone to a remote imaging mode allowing said imaging portion to execute an imaging operation by remote operation from said operating-side mobile phone in advance of said step of making said imaging portion of said imaging-side mobile phone execute an imaging operation, wherein said step of making said imaging portion of said imaging-side mobile phone execute an imaging operation includes a step of making said imaging portion of said imaging-side mobile phone execute an imaging operation when detecting that a communication state established by making said telephone call or taking said telephone call has been disconnected by a user after said ring-back tone in making said telephone call or said ringtone in taking said telephone call is repeated said first number of times in said remote imaging mode.

* * * * *